May 13, 1969  H. E. SHONTZ  3,443,452
FLEXIBLE CABLE CONTROL ASSEMBLY
Filed March 13, 1967
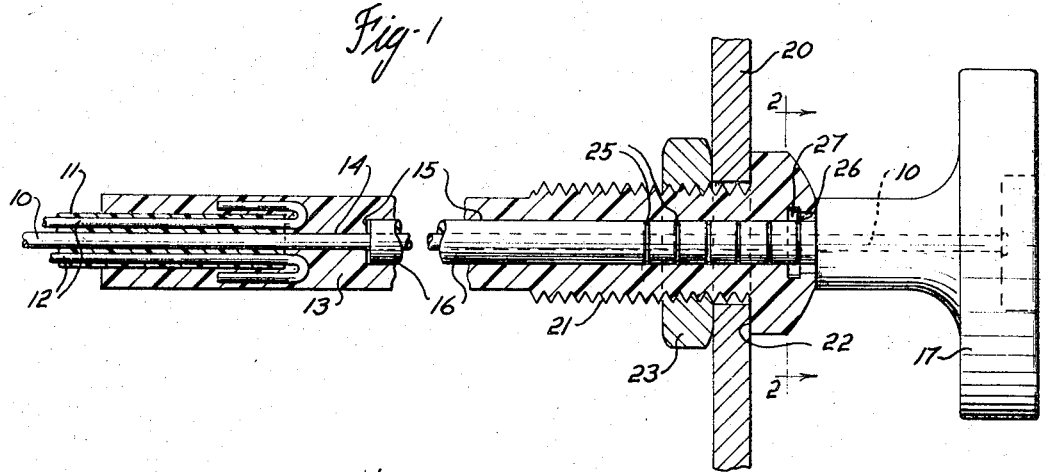
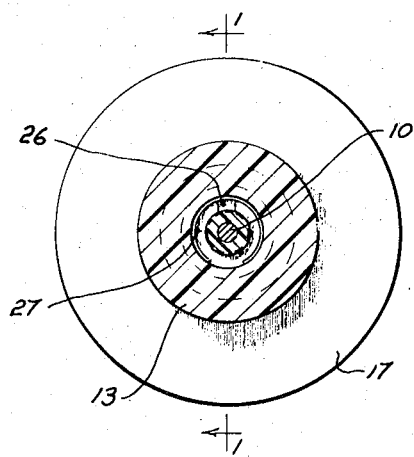
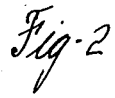
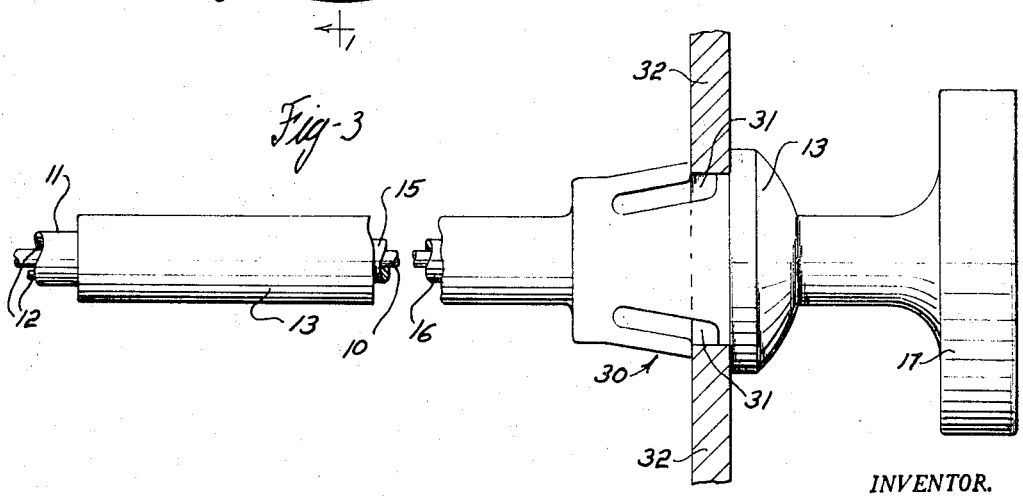
INVENTOR.
Harry E. Shontz
BY Synnestvedt & Lechner
ATTORNEYS

United States Patent Office 3,443,452
Patented May 13, 1969

3,443,452
FLEXIBLE CABLE CONTROL ASSEMBLY
Harry E. Shontz, Zieglerville, Pa., assignor to NW
Controls, Inc., North Wales, Pa., a corporation of
Pennsylvania
Filed Mar. 13, 1967, Ser. No. 622,725
Int. Cl. F16c 1/16
U.S. Cl. 74—502                3 Claims

ABSTRACT OF THE DISCLOSURE

A molded control assembly useful as a throttle or choke control for marine engines, farm machinery and the like, is disclosed. The assembly includes a molded plastic body which is bolted to one end of the outer sheath of a flexible control shaft. The sleeve is provided with an axially extending bore through which the core wire of a flexible control shaft extends. The coaxial counterbore in the sleeve receives a shaft to which the core wire is connected. Retaining means for the assembly include a laterally extending flange on the sleeve and a nut or other retainer means threadedly secured to the sleeve. Also disclosed are resilient fingers mounted on the sleeve in place of the nut, the fingers being bendable inwardly as they are forced through an opening and made of a material which is sufficiently resilient so that they snap outwardly when they clear the opening, thereby holding the control assembly permanently in place.

---

This invention relates to flexible control cables and more particularly to a control assembly for such a cable. The control assembly includes a molded plastic body mounted on the end of a flexible control shaft. The body supports and guides a control knob or other control member and is provided with means for supporting the end of the cable on a control panel.

The invention is especially well suited for use as a throttle or choke control for marine engines, farm machinery and for other equipment exposed to hard usage, dirt and to adverse weather conditions.

An important object of the invention is the provision of a molded plastic choke or throttle control assembly.

Among the other important objects of the invention is the provision of a control assembly for operating a flexible shaft which is extremely strong, substantially moistureproof and corrosion resistant.

Another important object of the invention is the provision of a control cable assembly which is dependable in operation and substantially maintenance free.

A still further object of the invention is the provision of a control cable assembly which provides for exceptional economies in production.

The various objects of the invention are achieved by a molded plastic body or sleeve member bonded to one end of the outer sheath of the flexible control cable. The sleeve has an axially extending bore at one end thereof through which the core of the flexible contral shaft extends and a coaxial counterbore at the other end extending lengthwise throughout a substantial portion of said sleeve or body. A shaft is slidably mounted within the counterbore. The shaft is connected at one end to the core member and the opposite extends outwardly from the counterbore. Clamping means including a radially extending flange on the sleeve and a nut or other retainer means is provided for mounting the body on an instrument panel or other support plate. Control means such as a knob is connected to the end of the slidably mounted shaft. A slip fit is provided between the shaft and the counterbore and the shaft extends substantially throughout the length of the counterbore so that a substantially smooth friction-free action is achieved.

Reference will now be made to an illustrative embodiment of the invention and to the accompanying drawings in which:

FIGURE 1 is an elevational view, partly in section, showing a control assembly made according to the teachings of the present invention;

FIGURE 2 is a sectional view taken among line 2–2 of FIGURE 1; and

FIGURE 3 is a view showing an alternative form of the invention.

As shown in FIGURES 1 and 2, flexible control shafts, of the general type to which the invention relate, include an inner flexible shaft or core 10 formed of stainless steel or other relatively flexible material and a covering sheath 11. Although other materials may be employed for the sheath, polyethylene is excellent for the purpose. Preferably the sheathing is reinforced with helically extending reinforcing wires 12.

According to the invention, a sleeve-like body portion 13, formed of polyethylene, nylon or other readily moldable plastic material is bonded to the sheath 11. According to the preferred technique, the helically extending reinforcing wires 12 are embedded in the body portion during the molding operation.

Body portion 13 is provided with an axial bore 14 into which the core 10 extends. A counterbored portion 15 is coaxial with bore 14 and extends through a major portion of the body.

A rigid slider rod 16 of enlarged diameter with respect to core 10 fits within the counterbore 15. The outer end of rod 16 is provided with a suitable knob or other operating element 17. In order to rigidly secure core, slider rod and knob together, the core 10 extends completely through the rod 16 and is secured to the operating knob. To prevent separation of these parts, the end of the core 10 is crimped or twisted and embedded in the knob.

Rod 16 may be made of either plastic or metal. Plastic materials such as polyethylene have a low coefficient of friction and are therefore excellent for the purpose. Stainless steel may also be employed if its additional rigidity is required. Preferably, the rod should extend through a major portion of the body, thereby minimizing wear of the parts, and providing for adequate throttle control. The core should fit relatively snugly within the body so as to prevent exposure of the inner core to moisture, yet not so snugly that operation is difficult.

Means are provided for mounting the control assembly on a control panel 20. For this purpose, the outer surface of the body portion 13 is threaded as shown as 21. One end is provided with a radially outwardly extending flange 22. A nut 23 fits over the body and onto the threaded portion 21. The assembly is fitted through an opening in a control panel with flange 22 bearing against the front side of the panel firmly clamping the body in place.

When used as a throttle, I prefer to provide means for adjustably fitting the knob and hence the core 10 at different axial positions with respect to the body portion. For this purpose, a plurality of circumferential grooves 25 are cut into the rod 16. Means, such as spring plate 26 mounted in an annular groove 27, presses against the rod and enters one of the grooves 25, yieldably holding the rod in axial position whenever alignment exists between a groove 25 and the spring. For most cases, five or six such grooves, which will provide for five or six throttle settings, will be sufficient, although this number can obviously be varied somewhat.

An alternative means for mounting the control assembly on a support plate is shown in FIGURE 3. The construction is substantially the same as that shown in FIGURE 1, except that resilient arms 30 are molded directly onto the body portion 13.

To install the control shown in FIGURE 3, the flexible cable and the body 13 are passed through an opening 31 in support plate 32. Resilient fingers 30 are bent inwardly as they are forced through opening 31, allowing them to pass through. Thereafter, when they clear the opening, the fingers snap outwardly, holding the control assembly permanently in place.

Both arrangements provide for an exceptionally simple and reliable control assembly. The sealed molded plastic construction is substantially impervious to moisture and corrosive atmosphere. The invention is excellent for use as a choke or throttle control for marine engines, farm machinery and various other types of equipment. Controls so formed will last practically indefinitely with little or no wear.

I claim:

1. In a control cable assembly including a flexible control shaft having an inner flexible core member and outer sheath covering said core member, a sleeve bonded to one end of said outer sheath, said sleeve having a bore at one end through which said core member extends, and a coaxial counterbore extending inwardly from the end opposite the outer sheath, a shaft slidably mounted within said counterbore, control means connected to said shaft for moving said shaft and core axially relative to said sleeve, support plate mounting means for said sleeve including a retaining flange integral with the sleeve and extending radially outwardly therefrom, and a pair of resilient ribs inclining outwardly from opposite sides of said body portion towards said retaining flange, said ribs being compressible inwardly to allow pasage through a panel opening and having sufficient resilience whereby to spring outwardly upon clearing of the sides of said opening.

2. An assembly according to claim 1, further including a plurality of depressions spaced along said shaft and resilient retaining means in said counterbored portion of said body, said retaining means being adapted to enter said depressions upon axial movement of said shaft relative thereto, thereby yieldably holding said shaft in set position axially with respect to said body portion.

3. An assembly according to claim 1, wherein said sleeve and said sheath are formed of the same molded plastic material.

References Cited

UNITED STATES PATENTS

| 1,683,433 | 9/1928 | Allen | 74—502 |
|---|---|---|---|
| 2,787,917 | 4/1957 | Schroeder | 74—502 |
| 3,000,231 | 9/1961 | Cochran | 74—502 X |
| 3,348,427 | 10/1967 | Wilkey | 74—502 |
| 3,348,428 | 10/1967 | Shaeffer | 74—502 |
| 3,354,742 | 11/1967 | Tschanz et al. | 74—501 |
| 3,373,632 | 3/1968 | Jeromson et al. | 74—502 |

LEONARD H. GERIN, *Primary Examiner.*

U.S. Cl. X.R.

74—487